Figure 1:
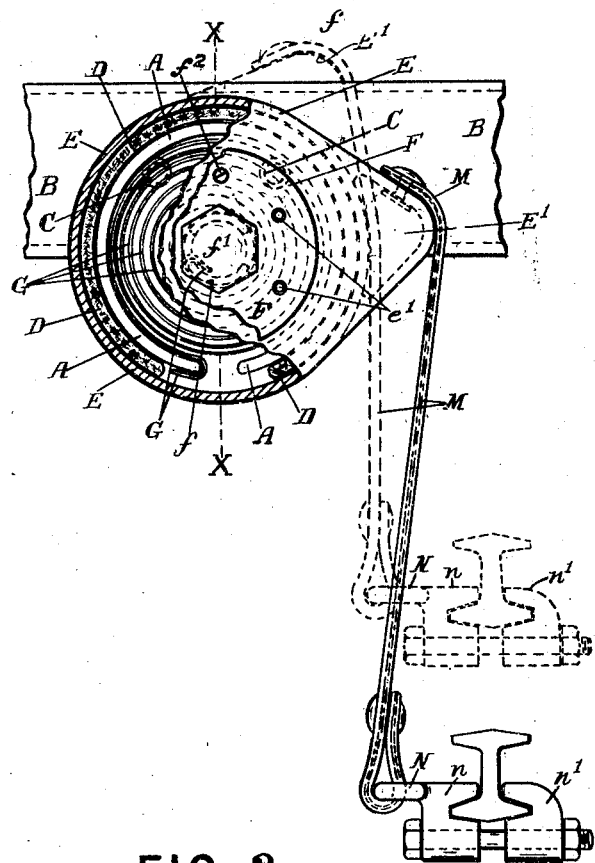

June 24, 1930.  F. G. G. ARMSTRONG  1,767,113
SHOCK ABSORBING MEANS FOR VEHICLES Filed May 7, 1926

Inventor:
Fullerton G. G. Armstrong
by Richard E. Babcock
Attorney

Patented June 24, 1930

1,767,113

UNITED STATES PATENT OFFICE

FULLERTON GEORGE GORDON ARMSTRONG, OF BEVERLEY, ENGLAND

SHOCK-ABSORBING MEANS FOR VEHICLES

Application filed May 7, 1926, Serial No. 107,429, and in Great Britain May 14, 1925.

This invention relates to that kind of shock-absorbing means for motor cars and like motor road vehicles in which a drum attached to the chassis of the vehicle has arranged around it a friction member which is slidable around the drum, to which friction member is connected one end of a strap or the like the other end of which is connected to one axle or bearing spring of the vehicle, a spring being employed to draw the friction member around the friction drum and the strap or the like with it to take up the slack of the strap or the like when the bearing springs of the vehicle yield to any unevenness of the road and the axles and the body of the vehicle approach each other as a consequence, the friction between the material and the drum and tension put on the spring, on the body and the axles separating, retarding the recoil or expansion of the bearing springs and so preventing shock to the vehicle and its occupants or contents.

My invention has for its object improved shock-absorbing means of the kind referred to which is extremely simple of construction and wherein the strap or the like which forms the connection between the spring-containing device connected to the frame of the vehicle and an axle or bearing spring of the vehicle, is connected to a cam-like portion of or projection on a rotatable cover, to which, or to a bolt or the like secured thereto, one end of the clock or like spring is connected, whereby when the body and the axles of the vehicle approach each other on the bearing springs yielding owing to unevenness of the road, the strap or the like which connects such rotatable cover is, as the cover rotates, drawn up, and on its upward movement moves nearer to the centre of the spring-containing device, so reducing the purchase or leverage which the strap or the like has on the frictional portions of the device, that it increases the resistance the axles have to overcome to return to their normal positions.

According to my invention, I employ a box or casing having a circular interior and provided on its periphery with a cam-like or other suitably shaped enlargement or projection, the said box or casing being open at one side and being provided with a central boss, bolt or the like.

Arranged inside the box or casing is a strong metal ring or circular hollow member containing a clock or like coiled spring one end of which is connected to the said ring or hollow member, and the other to the boss, bolt or the like in the centre of the box or casing, the said ring or hollow member being provided on its periphery with suitable friction material which fits tightly the interior of the box or casing whereby friction is created between the said ring or hollow member in which the spring is enclosed, and the interior of the box or casing.

If desired, the friction material may be fitted to the inside of the circular wall of the box or casing instead of to the periphery of the ring or hollow member in which the spring is enclosed, or a friction disc may be secured to the front of the ring or hollow member to bear against the inside face of the box or casing, or friction material may be dispensed with if desired and a stronger spring be employed.

The boss, bolt or the like in the centre of the box or casing may be rotatable so that on turning it in one direction or the other the tension on the coiled spring can be increased or decreased as required, in which case means of any suitable kind are provided for securing the said boss or the like against rotation when it has been turned to put the required tension on the spring.

The ring or circular hollow member provided with the spring and which is arranged in the box or casing, is bolted or otherwise suitably rigidly secured to the chassis or body of the vehicle, and the box or casing which is adapted to rotate to a certain extent on the ring or hollow member itself, is connected by a flexible strap, piece of belting, rope or the like to one of the road wheel axles, or to a suspension or bearing spring of the vehicle, the other end of the strap or the like being connected to the upper surface of the cam-like or other enlargement or projecting portion of the box or casing.

Figure 2:
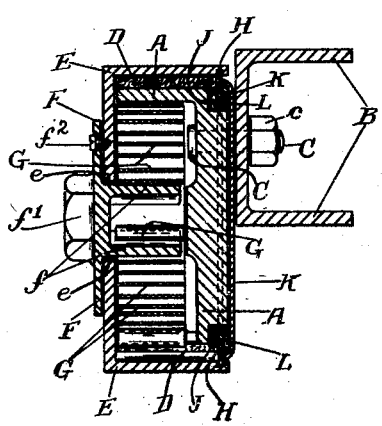
Figure 3:
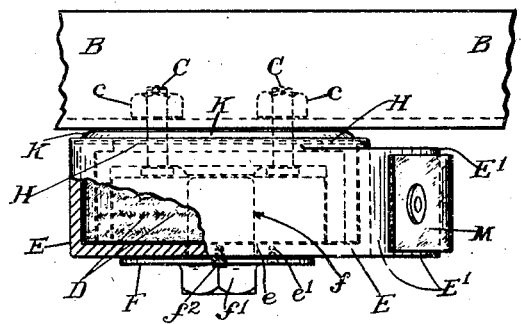
Figure 4:
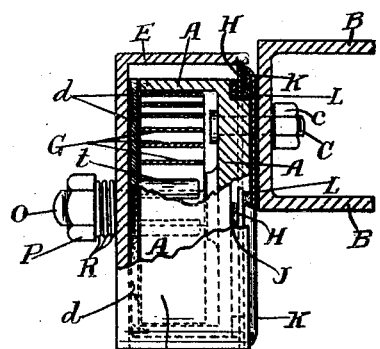

In the accompanying drawings, Fig. 1 is a part sectional side view of a shock-absorbing device in accordance with my invention, Fig. 2 is a section on the line x—x of Fig. 1, Fig. 3 is a plan view partly in section, and Fig. 4 is a part sectional end view of a slightly modified construction of the device.

Referring first to Figs. 1 to 3 inclusive of the drawings, A is a hollow member in the form of a circular open fronted box which is secured to the chassis or frame B of the vehicle by bolts C, C and nuts c, c screwed thereon, the wall of the said hollow member having, in the arrangement shown, a gap in it, and D is suitable friction material secured to the periphery of the wall of such hollow member.

E is a box or casing which fits over the friction material D fastened to the periphery of the wall of the hollow member A and fits the same tightly, the closed front of the box or casing E being provided with a central hole e.

F is a circular disc or plate provided on its inside face with a hollow boss-like projection $f$, and on its outside with a nut-like boss $f^1$ to take a spanner or other suitable implement for turning the disc or plate and the hollow boss-like projection to adjust the tension of the spring hereinafter mentioned, the said disc or plate being provided with a hole to take a pin or screw $f^2$ which is adapted to engage any one of a series of holes $e^1$ in the front of the box or casing E to hold the disc in the position to which it is turned to regulate the tension of the spring.

G is a strong clock or like coiled spring one end of which is bent to engage one end of the wall of the hollow member A at the point where the gap in such wall is formed, and the other end of which spring is bent to engage a portion of the hollow boss-like projection $f$ on the disc or plate F, which projection is notched or slitted to allow of this, the spring being coiled around the hollow projection $f$ and enclosed in the hollow member A.

H is a not quite complete spring metal flat ring, which is sprung into engagement with an annular groove in the inside face of the circular wall of the box or casing E near the back end of such wall, and J is a felt or other suitable washer arranged between such ring and a shoulder on the back of the hollow member A, K is a metal cap or back piece which fits the back of the hollow member A and which bears against the portion of the frame of the vehicle to which the hollow member A is secured, and L is a felt or other suitable washer arranged between such cap or back piece and the spring metal ring H.

M is a flexible strap one end of which is connected to the upper side of the cam or like projection $E^1$ on the rotatable box or casing E and the other end of which is connected, in the arrangement shown, to a link N on one of a pair of clamping pieces $n$, $n^1$ secured to a road wheel axle.

I may, if I so wish, dispense with the rotatable disc or plate F provided with the hollow boss-like projection for regulating the tension on the spring G, and form a boss on the inside of the box or casing E at the centre thereof and connect the inner end of the spring G to such boss, which boss would preferably be hollow and slitted to allow of this, the required tension on the spring being obtained by rotating the box or casing E.

Referring now to Fig. 4 of the drawings, which shows a slightly modified form of the device, $d$ is a disc or ring of suitable friction material which is fitted to the open front of the hollow member A in substitution for, or in addition to the friction material secured to the periphery of the annular wall of such hollow member, as described with reference to Figs. 1 to 3 inclusive.

O is a long stud or member formed on the inside of the back of the hollow member A and which projects through a hollow boss $t$ formed on the inside of the front of the box or casing E and through the central hole in the front of the said box or casing, the end of such stud or projection being screw-threaded to take a nut P, and R is a spiral spring arranged on the said stud O between the nut P and the front of the box or casing E, the said spring putting pressure on the front of the box or casing whereby the inside face of the front of such box or casing is forced into contact with the friction disc or ring secured to the open front of the hollow member A.

In this arrangement the inner end of the clock or like spring G is connected to the hollow boss $t$ formed on the inside of the front of the box or casing E instead of to the hollow boss of the disc or plate, which disc or plate is dispensed with, the tension on the spring G being adjusted by rotating the box or casing E.

The vehicle is provided with any suitable number of the shock absorbing devices, the number being preferably the same as the number of road wheels with which the vehicle is provided.

In operation, when the bearing springs of the vehicle yield to any unevenness of the road and the axles and the body of the vehicle move towards each other owing to the springs being compressed, the straps, belts or the like slacken and the springs in the fixed rings or hollow members arranged in the boxes or casings expand and turn the said boxes or casings to a greater or less extent, depending upon the amount of compression of the bearing or suspension springs, with the result that the cam or other shaped enlargements on the boxes or casings, which are normally horizontal, or almost so, turn in an upward direction, with the result that the straps or the like connected thereto move in the direction of and consequently nearer to the centres of the boxes or casings as shown in dotted lines in Fig. 1, so reducing the purchase or leverage which the straps or the like have on the boxes or casings and thereby offer increased resistance to the axles returning to their normal positions.

Although I have described and illustrated two methods of employing material to create friction between the ring or circular hollow member arranged in the box or casing and the interior of the box or casing, I do not limit myself to such methods, as I may employ any other suitable method, or I may even dispense with such friction material and employ a circular hollow member which would be an easy working fit in the circular box or casing, or between the periphery of which and the circular interior of the box or casing there would be an annular space, and provide such circular hollow member with a stronger spring than is employed when friction material is used.

With this arrangement, particularly when the circular hollow member is of so much less diameter than the interior of the box or casing that an annular space intervenes between the two, the circular hollow member would preferably be provided with a strong central pin or stud to pass into the central boss or the like of the box or casing, which boss would be formed hollow to receive it, as shown in Fig. 4, the box or casing being thus rotatable on a central bearing which prevents other than true rotation of the same.

The devices work in harmony with the bearing or suspension springs of the vehicle and offer greater or less resistance to the recoil or return of such springs to their normal positions corresponding with the extent of compression of such springs, in addition to which they assist the flexibility of the springs.

Having thus described my invention, what I claim as new and desire to secure by Letters Patent is:—

1. A shock absorber comprising in combination a fixed element, an element rotatable relatively thereto, a torsion spring connecting said elements, means to apply a constant frictional brake between said elements irrespective of their angular movement, a movable part, flexible connecting means between said movable part and said rotatable element, and means to vary the torque applied by said flexible connection to said rotatable element according to the angular displacement of said rotatable element.

2. A shock absorber comprising in combination a fixed element, an element rotatable relatively thereto, a torsion spring connecting said elements, means to apply a constant frictional brake between said elements irrespective of their angular movement, a movable part, flexible connecting means between said movable part and said rotatable element, means to vary the torque applied by said flexible connecting means to said rotatable element according to the angular displacement of said rotatable element, and means to adjust the tension of said torsion spring.

3. A shock absorber comprising in combination a fixed casing, a casing fitting over and rotatable relatively to said casing, a torsion spring connecting said casings, a constant frictional brake applied between said casings irrespective of their angular movement, a movable part which may be the axle of a vehicle, a flexible connection between said movable part and said rotatable casing, and means to vary the torque applied by said flexible connection to said rotatable casing according to the angular displacement of said rotatable casing.

4. A shock absorber comprising in combination a peripherally slotted fixed circular casing, a hollow casing fitting over and rotatable relatively to said fixed casing, a slotted cylindrical projection on the inner surface of said rotatable casing, a cam shaped projection on the outer periphery of said rotatable casing a torsion spring, means to secure the ends of said torsion spring in said slots, friction material arranged peripherally between said casings, a moving part, a flexible connection between said moving part and said rotatable casing, said flexible connection passing over said cam shaped projection.

5. A shock absorber comprising in combination a peripherally slotted fixed circular casing, a hollow casing fitting over and rotatable relatively to said fixed casing, a slotted cylindrical projection on the inner surface of said rotatable casing, a cam shaped projection on the outer periphery of said rotatable casing, a torsion spring, means to secure the ends of said torsion spring in said slots, means to secure said cylindrical projection in various positions relative to said rotatable casing, friction material arranged peripherally between said casings, a moving part, a flexible connection between said moving part and said rotatable casing, said flexible connection passing over said cam shaped projection, and sealing means to exclude dust and the like.

6. A shock absorber comprising in combination a circular fixed casing, a shoulder on said fixed casing, a hollow casing fitting over and rotatable relatively to said fixed casing provided with an annular groove on the inner surface, a radially split ring sprung into engagement with said annular groove, a felt washer arranged between said ring and said shoulder, a circular cap fitting into said rotatable casing, a felt washer arranged between said ring and said cap, a torsion spring connecting said casings, a constant frictional brake applied between said casings irrespective of their angular movement, a moving part, a flexible connection between said moving part and said rotatable casing, and means to vary the torque applied by said flexible connection to said rotatable casing according to the angular displacement of said rotatable casing.

In testimony whereof, I have signed my name to this specification at Kingston-upon-Hull, England, this 27th day of April, 1926.

FULLERTON GEORGE GORDON ARMSTRONG.